United States Patent
Diehl et al.

(10) Patent No.: US 9,267,483 B2
(45) Date of Patent: Feb. 23, 2016

(54) METHOD AND CONTROL DEVICE FOR OPERATING A GASOLINE ENGINE

(75) Inventors: Markus Diehl, Augsburg (DE); Tobias Lindermayr, Ehekirchen (DE)

(73) Assignee: MTU ONSITE ENERGY GMBH, Augsburg (DE)

( * ) Notice: Subject to any disclaimer, the term of this patent is extended or adjusted under 35 U.S.C. 154(b) by 283 days.

(21) Appl. No.: 13/990,724

(22) PCT Filed: Nov. 14, 2011

(86) PCT No.: PCT/EP2011/005720
§ 371 (c)(1),
(2), (4) Date: Jul. 23, 2013

(87) PCT Pub. No.: WO2012/072195
PCT Pub. Date: Jun. 7, 2012

(65) Prior Publication Data
US 2013/0291834 A1 Nov. 7, 2013

(30) Foreign Application Priority Data
Nov. 30, 2010 (DE) .......... 10 2010 062 198

(51) Int. Cl.
*F02P 17/02* (2006.01)
*F02P 5/02* (2006.01)
(Continued)

(52) U.S. Cl.
CPC .............. *F02P 5/02* (2013.01); *F02D 19/022* (2013.01); *F02D 19/023* (2013.01);
(Continued)

(58) Field of Classification Search
CPC ........ F02D 37/02; F02P 17/02; F02P 5/1502; F02B 43/12

USPC ............ 123/406.12, 406.44, 406.45, 406.47, 123/406.55; 701/101–104
See application file for complete search history.

(56) References Cited

U.S. PATENT DOCUMENTS 4,703,733 A * 11/1987 Fukutomi et al. ........ 123/406.52
4,716,873 A * 1/1988 Takaba et al. ............ 123/406.34
(Continued)

FOREIGN PATENT DOCUMENTS

DE 3720097 A1 1/1988
DE 3918683 A1 9/1990
(Continued)

OTHER PUBLICATIONS

PCT International Search Report dated Aug. 8, 2012 for PCT/EP2011/005720.

*Primary Examiner* — Mahmoud Gimie
(74) *Attorney, Agent, or Firm* — Reising Ethington, P.C.

(57) ABSTRACT

The disclosure relates to a method for operating a spark ignition gas engine, with fuel gas in the form of biogas by setting an ignition time (ZZP) of the spark ignition gas engine. The method comprises to following steps: mixing of air and fuel gas to form a combustible gas mixture in a mixing arrangement, feeding in and igniting the combustible gas mixture in the combustion chamber while setting an ignition time (ZZP) and burning the combustible gas mixture while discharging exhaust gas from the combustion chamber. The method further comprises the steps of: detection of an exhaust gas temperature (T_AG) of the exhaust gas, predefining at least one reactor position (LRV) of a component of the mixing arrangement, setting the ignition time (ZZP) of the spark ignition gas engine as a function of the exhaust gas temperature (T_AG) and the reactor position (LRV). The reactor position (LRV) is predefined as a manipulated variable by a mixture controller.

15 Claims, 4 Drawing Sheets

(51) Int. Cl.
  *F02D 19/02* (2006.01)
  *F02D 41/00* (2006.01)
  *F02D 41/14* (2006.01)
  *F02P 5/04* (2006.01)
  *F02M 21/02* (2006.01)
  *F02D 37/02* (2006.01)
  *F02P 5/15* (2006.01)
  *F02B 43/12* (2006.01)

(52) U.S. Cl.
  CPC ....... *F02D 41/0027* (2013.01); *F02D 41/1446* (2013.01); *F02M 21/0215* (2013.01); *F02P 5/04* (2013.01); *F02P 17/02* (2013.01); *F02B 43/12* (2013.01); *F02D 37/02* (2013.01); *F02D 2200/02* (2013.01); *F02D 2200/0404* (2013.01); *F02P 5/151* (2013.01); *F02P 5/1502* (2013.01); *Y02E 20/14* (2013.01); *Y02E 50/12* (2013.01); *Y02T 10/32* (2013.01)

(56) References Cited

U.S. PATENT DOCUMENTS

| | | | |
|---|---|---|---|
| 4,867,127 A | | 9/1989 | Quirchmayr et al. |
| 4,942,860 A | * | 7/1990 | Chujo et al. ............. 123/406.44 |
| 5,211,011 A | * | 5/1993 | Nishikawa et al. ............. 60/284 |
| 5,278,762 A | | 1/1994 | Kawamura |
| 5,697,340 A | * | 12/1997 | Shino et al. ............. 123/406.46 |
| 6,178,927 B1 | | 1/2001 | Rieck et al. |
| 6,334,431 B1 | * | 1/2002 | Kanehiro et al. ........ 123/406.53 |
| 6,766,786 B2 | | 7/2004 | Plohberger et al. |
| 6,932,057 B2 | * | 8/2005 | Sawada et al. ............ 123/406.47 |
| 7,418,942 B2 | * | 9/2008 | Niimi ............................. 123/327 |
| 2002/0092498 A1 | | 7/2002 | Plohberger et al. |
| 2009/0076709 A1 | | 3/2009 | Shiraishi et al. |
| 2009/0248278 A1 | * | 10/2009 | Nakasaka ..................... 701/103 |
| 2010/0274463 A1 | * | 10/2010 | Itoga et al. ..................... 701/102 |

FOREIGN PATENT DOCUMENTS

| | | | | |
|---|---|---|---|---|
| DE | 4109561 | A1 | 9/1991 | |
| DE | 19808829 | A1 | 9/1999 | |
| DE | 10252953 | B4 | 6/2005 | |
| DE | 102004060893 | A1 | 9/2005 | |
| DE | 102004060893 | B4 | 7/2006 | |
| DE | 102007010339 | A1 | 9/2008 | |
| DE | 102007010339 | A1 * | 9/2008 | ............. F02D 19/02 |
| EP | 0142490 | A2 | 5/1985 | |
| EP | 0259382 | A1 | 3/1988 | |
| EP | 0259382 | B1 | 10/1989 | |
| EP | 0894959 | A2 | 2/1999 | |
| EP | 1225330 | A2 | 7/2002 | |
| EP | 1561931 | A1 | 8/2005 | |
| EP | 1158149 | B1 | 4/2006 | |
| JP | H7071322 | A | 3/1995 | |
| WO | WO-2012012511 | A1 | 1/2012 | |

* cited by examiner

METHOD AND CONTROL DEVICE FOR OPERATING A GASOLINE ENGINE

CROSS REFERENCE TO RELATED APPLICATIONS

This application is a National Phase Application related to PCT/EP2011/005720 filed on Nov. 14, 2011, which application claims priority to DE 10 2010 062 198.6 filed on Nov. 30, 2010, which applications are incorporated herein by reference in their entirety.

TECHNICAL FIELDS

The disclosure relates to a method for operating a gasoline engine with an adjustment of ignition time comprising the following steps: mixing air and fuel gas to form a combustion gas mixture in a mixing device, feeding and igniting the combustion gas mixture in a combustion chamber with the ignition time being adjusted, as well as burning the combustion gas mixture with a discharge of exhaust from the combustion chamber. Further, the disclosure relates to a control device for operating a gasoline engine.

BACKGROUND

A method and a control device of the type mentioned at the outset for operating a gasoline engine are described in DE 10 2004 060 893 B4. Gasoline engines of the above-mentioned type are increasingly used in systems for decentralized energy generation in combination with a generator. These systems can be used for pure power generation or for a combined generation of power-heat-refrigeration. For the power generation, such systems can preferably be used as emergency power, permanent power, or peak load power aggregates and designed for specific applications.

It is discernible from DE 10 2004 060 893 B4 that during the operation of a gasoline engine, primarily when biogas is used as the fuel, considerable fluctuations of the caloric value and the burning behavior of fuel gas may occur. For example, it is possible that a biogas facility with confermentation shows a $CH_4$ content in the fuel gas with fluctuations ranging from 45 to 65%. In most cases the complementary content in the fuel gas is $CO_2$, so that with an increasing ratio of $CO_2$ the combustion speed of the combustion gas mixture reduces. This may lead to a reduction of the effectiveness and an increase in the exhaust temperature, and perhaps also the NOx emissions, when the ignition time for an ignition device of the gasoline engine is not adjusted. In general, it has been recognized that an adjustment of the ignition time is required to consider the variation of the combustion behavior of the fuel gas during operation of a gasoline engine. According to DE 10 2004 060 893 B4, to the extent possible, technically and economically expensive gas sensors shall be avoided for detecting the combustion behavior of fuel gas. Thus, in order to compensate the above-mentioned disadvantageous influences in a gasoline engine, the determination of the composition of the fuel gas used poses a problem.

According to DE 10 2004 060 893 B4 it has been recognized that it is possible to adjust the ignition time depending on an actual value of the exhaust temperature. For this purpose a target value is predetermined for the exhaust temperature and the ignition time is adjusted for the exhaust temperature to reach the target value. According to DE 10 2004 060 893 B4 it has been recognized that by changing the ignition time the burning behavior and/or the $CO_2$ content of the fuel gas can be compensated in a defined fashion. This provides one method of yielding an essentially constant effectiveness and a defined NO emission while omitting a gas sensor, even when the composition of the fuel gas fluctuates widely.

Such a concept, to some extent successful, has limitations, though, when the exhaust temperature increases due to other influences, such as increasing wear and tear of the engine. In this case, an adjustment of the ignition time to an earlier point, performed according to DE 10 2004 060 893 B4 would lead, under disadvantageous framework conditions, to the gasoline engine developing a knocking operation. In other words, with increasing wear and tear of the engine, a regulation of the ignition time exclusively based on the exhaust temperature leads to the engine no longer being operated according to the gas quality and/or no longer being operated according to the burning behavior of the fuel gas. Reliable operation of a gasoline engine, even in such cases, is desirable.

In order to waive vulnerable gas sensors, namely oxygen sensors, EP 0 259 382 B1 also suggests a method for controlling the air ratio of a gasoline engine. The solution suggested herein fails to provide any adjustment of the ignition time but rather a control of the lambda value of the combustion gas mixture within a required lambda range. For this purpose, in EP 0 259 382 B1 the gasoline engine is adjusted to lean operation by guiding the lambda control depending on the pressure of the combustion gas mixture prior to the inlet valves of the engine and depending on the performance. Constant technical engine parameters are conditional for such a control method, such as fill level and effectiveness of the engine. Although these conditions are largely encountered in practical operation, the widely varying burning behavior of the fuel gas mentioned at the outset leads to strong deviations of the NO emission and the effectiveness from the target values when the ignition time is not adjusted.

In this regard, an improved concept is required in which the flow rate of a fuel gas or a combustion gas mixture is adjustable. In particular, while avoiding expensive gas sensors, an ignition time shall be adjustable according to the composition of the fuel gas or the combustion gas mixture. Particularly the disadvantages shall be avoided to the extent possible, which are connected to a temperature control according to DE 10 2004 060 893 B4.

SUMMARY to the disclosure provides a method and a control device in which expensive gas sensors to determine a composition of fuel gas or combustion gas mixture are avoided to the extent possible and yet an adjustment of the ignition time is possible based on the composition of the fuel gas or the combustion gas mixture in an improved fashion. In particular, a method and a respective device shall be comparatively reliable and robust against age-related influences of a gasoline engine.

A method of the type mentioned at the outset is disclosed herein.

In particular, the concept of the disclosure has proven itself in the operation of a gasoline engine with fuel gas in the form of biogas. An adjustment of the ignition time is primarily focused on the exhaust temperature, as concretely described in DE 10 2004 060 893 B4, but only insufficiently considers the age-related influences of a gasoline engine on the control of the ignition time. On the other hand, the disclosure has recognized that the adjustment of the ignition time of the gasoline engine dependent on the exhaust temperature is generally beneficial. The disclosure has further recognized that the adjustment of the ignition time according to the composition of the fuel gas or the combustion gas mixture used is beneficial. In particular, in this way gas sensors measuring the composition of the fuel gas or the combustion gas mixture can be waived. The disclosure is based on the concept that a mixture control is generally suitable to attain the problem. Furthermore the disclosure has recognized that a solution as described in EP 0 259 382 B1 can be further improved, particularly when the gasoline engine is operated with fuel gas in the form of biogas.

Furthermore it has been recognized by the disclosure that it is possible by predetermining a throttle setting of one component of a mixing arrangement to mix air and fuel gas to form a combustion gas mixture, wherein this throttle setting can be used to adjust the ignition time of the gasoline engine. In other words, the disclosure has recognized that a throttle setting of one component of the mixing arrangement can be used for controlling the ignition time. The disclosure has recognized that this measure is successful, i.e. adjusting the ignition time leads to a comparatively constant effectiveness and $NO_x$ emission when the throttle setting in combination with the exhaust temperature is considered for the regulation in order to adjust the ignition time of the gasoline engine based on this combination.

The applicant has recognized based on lab tests shown as examples depicted in FIGS. 3 to 6 that it is possible in a defined constellation, particularly here without any gas sensors, to yield reliable information regarding the burning behavior, particularly the caloric value and/or the composition of the fuel gas, and then allow the adjusting, particularly in a controlled fashion, of the ignition time depending on the throttle setting and the exhaust temperature. The disclosure uses the throttle position of one component of the mixing arrangement as an input value for an ignition clock to reliably provide information regarding the burning behavior of the fuel gas, which commonly could only be determined using expensive gas sensors. This measure works, as further recognized by the disclosure, when a mixing control is used in order to predetermine the throttle setting as the adjusting parameter and, in this regard, adjust the ignition time also depending on the exhaust temperature.

Within the scope of a particular further development the ignition time can be adjusted depending on the throttle setting such that a first preliminary ignition time is determined based only on the throttle setting. Preferably, for this purpose, a preliminary ignition time is stated depending on the burning behavior of the fuel gas, e.g., respectively via an engine-specific characteristic or other similarly correlated information. In particular, an exemplary control device comprises a suitably embodied computing unit with characteristics, which interpret a throttle setting given for the gasoline engine and/or an ignition time set for the gasoline engine depending on the burning behavior of the fuel gas. In other words, the throttle setting can be stated depending on the burning behavior of the fuel gas.

The further development has recognized that via the composition of the fuel gas the throttle setting and the preliminary ignition time can be correlated in order to provide a target value for an ignition time of the gasoline engine depending on the throttle setting. Within the scope of the particularly preferred further development, it is especially possible that first it is controlled if an actual value of an exhaust temperature is and/or remains within a predetermined exhaust temperature range before a control value of the ignition time determined from the target value of the ignition time is transmitted as the guideline to an ignition device of the gasoline engine.

The disclosure has successfully recognized that when the caloric value of the fuel gas drops (e.g., by a reduction of the $CH_4$ content in the biogas) for example a gas control valve, lambda valve, or a similar throttle means of the mixing arrangement should be opened wider to keep constant the NO emissions or the effectiveness of the gasoline engine. This way, with constant engine performance, an increase of the amount of exhaust is achieved, so that in the inverse conclusion a reproducible connection develops between a throttle setting of the components of the mixing arrangement (e.g., lambda control valve) and the caloric value of the fuel gas. In this context the disclosure has recognized that this reproducible connection can be used as a characteristic for a control path. The disclosure has recognized that beyond that, influences such as engine performance, air or gas temperature of the combustion gas mixture are relatively low and, except for causing linear corrections, have no influence on the general success of the concept.

Advantageous further developments of the disclosure are discernible from the dependent claims and provide advantageous options in detail for realizing the above-explained concept within the scope of the disclosure as well as regarding other advantages.

In one exemplary arrangement, the mixture control comprises an inlet for the performance of the gasoline engine or a generator. The mixture control may also comprise an inlet for pressure and/or temperature of a combustion gas mixture. In particular, but not mandatorily, within the scope of the above-mentioned exemplary further development, a throttle setting of a component of a mixing arrangement can be used in combination with an exhaust temperature of the exhaust in order to adjust the ignition time in a gasoline engine.

In general, the throttle setting can be transmitted as a target value from the mixture control directly to the ignition timer and this way in combination with an exhaust temperature serve to determine the ignition time. Additionally, the throttle setting of the component of the mixing arrangement can also be transmitted as the actual value to the ignition timer in order to adjust the ignition time of the gasoline engine. In this regard, either a target value or an actual value of a throttle setting is relevant, either alone or in combination, in order to adjust an ignition time together with an exhaust temperature.

Advantageously the method for operating a gasoline engine can be activated or deactivated within the scope of a further development as an option within the scope of a general operating method. For example, the method according to the concept of the disclosure can be activated as an option in case fuel gas is used with widely varying burning behavior, particularly caloric value and/or composition, such as biogas, to operate the gasoline engine. The method according to the concept of the disclosure can also be deactivated within the scope of this further development in case fuel gas is used to operate the gasoline engine which shows only a negligible fluctuation range of a burning behavior, such as natural gas.

One exemplary arrangement provides a system for the decentralized energy generation with a gasoline engine and a generator connected thereto in order to form a power aggregate with the ignition timer and/or the mixture control being connected via a measuring line to the gasoline engine and/or the generator for conducting power. This way the further development uses a control device with an ignition timer as well as a mixture control, which are combined via the power of the gasoline engine and/or the generator.

Advantageously the ignition timer, in addition to the inputs for temperature of the exhaust and the throttle setting, may also comprise an input for the temperature of the fuel gas and the air temperature. Additionally, the mixture control, in addition to the outlet for the throttle setting, may also comprise an input for the power of the gasoline engine and/or the generator. Advantageously the mixture control also comprises an input for the temperature and/or the pressure of a combustion gas mixture. This way certain additional control corrections can be implemented, particularly linear ones.

Beneficially, when needed additionally, the ignition timer may forward a final or preliminary ignition time to the ignition device of the gasoline engine depending on the power of the gasoline engine and/or the generator. This may be advantageous in that the ignition time of the combustion gas mixture in a combustion chamber of the gasoline engine can be adjusted depending on the power, particularly the combustion gas mixture, among other things, can be ignited, burned, and discharged as exhaust depending on the power.

With regard to the device, an objective of the disclosure is also attained via a gasoline engine, particularly comprising a heat exchanger to form a power-heat cogeneration. The gasoline engine comprises particularly a control device according to the above-mentioned concept. In particular the gasoline engine comprises:
- a mixing arrangement to mix air and fuel gas to form a combustion gas mixture,
- a combustion gas mixture guidance to feed the combustion gas mixture to a combustion chamber of the gasoline engine,
- an ignition device to ignite a combustion gas mixture in the combustion chamber with the ignition time being adjusted,
- an exhaust guidance to discharge the exhaust of the burned combustion gas mixture from the combustion chamber.
- an exhaust temperature unit to detect an exhaust temperature (TAG) of the exhaust in the exhaust pipe,
- a mixture control to predetermine at least one throttle setting (LRV) as a control parameter for a component of the mixing arrangement, and
- an ignition timer for adjusting the ignition time (ZZP) via the ignition device depending on the exhaust temperature (T_AG) and the throttle setting (LRV) are further provided.

Preferably, the gasoline engine is connected to a generator in order to form a power aggregate, with the ignition timer and/or the mixture control being connected to conduct a power to the gasoline engine and/or to the generator via a measuring line. In particular, the concept of the disclosure leads to a power aggregate comprising a gasoline engine and a generator, particularly a power aggregate with a power-heat cogeneration.

Advantageously, the mixture control is connected via at least one additional measuring line to guide a pressure (MAP) and/or temperature (MAT) of the combustion gas mixture with a pressure and/or temperature sensor in the combustion gas mixture guidance.

The throttle setting (LRV) can be predetermined by a mixture control as a control variable to the components of the mixing arrangement and/or the ignition timer.

The component of the mixing arrangement may be embodied as a throttle organ in a gas supply line. In particular the component of the mixing arrangement is formed via a lambda control valve with an actuator, e.g., a motor, by which the throttle setting (LRV) can be predetermined as a setting of the lambda control valve. The mixing arrangement advantageously comprises a lambda control valve and a mixer connected downstream in reference to the lambda control valve, which is connected to an air intake to mix air and fuel gas to form a combustion gas mixture.

The mixing arrangement can advantageously also comprise a mixer in the form of a choke and a zero-point control.

In one exemplary arrangement, the mixing arrangement comprises a gas temperature sensor which is connected via a sensor line to guide a gas temperature (T_GAS) to the ignition timer. The air intake particularly comprises an air temperature sensor, which is connected via a sensor line to guide an air temperature (T_LUFT) to the ignition timer. The exhaust temperature unit may be formed via an exhaust temperature sensor in the exhaust pipe, which is arranged between an exhaust outlet and an exhaust turbine.

In the following, exemplary embodiments of the disclosure are described based on the drawings. The drawings shall illustrate exemplary embodiments not necessarily to scale, but rather in order to serve explanatory purposes the drawing is embodied in a schematic and/or slightly distorted form. With regard to amendments of teachings directly discernible from the drawings, reference is made to the relevant prior art. Here, it shall be considered that various modifications and changes with regard to shape and detail of an embodiment may be performed without deviating from the general idea of the disclosure. The features according to the disclosure as set forth in the description, the drawing, as well as the claims may be employed both individually, as well as in arbitrary combinations for the further development of the disclosure. Additionally, all combinations comprising at least two of the features disclosed in the description, the drawing, and/or the claims are included in the scope of the disclosure. The general idea of the disclosure is not limited to the precise form or the detail of the exemplary embodiments shown and described in the following or limited to an object, which would be restrictive in reference to the object claimed in the claims. Within the measuring ranges any values included within the limits mentioned shall be considered disclosed as limits and used arbitrarily and subject to being claimed. For reasons of simplification, in the following identical or similar parts or parts with identical or similar functions are marked with the same reference characters.

BRIEF DESCRIPTION OF THE DRAWINGS

Additional advantages, features, and details of the disclosure are discernible from the following description of the preferred exemplary embodiments as well as the drawing; it shows in.

DETAILED DESCRIPTION

Figure 1:
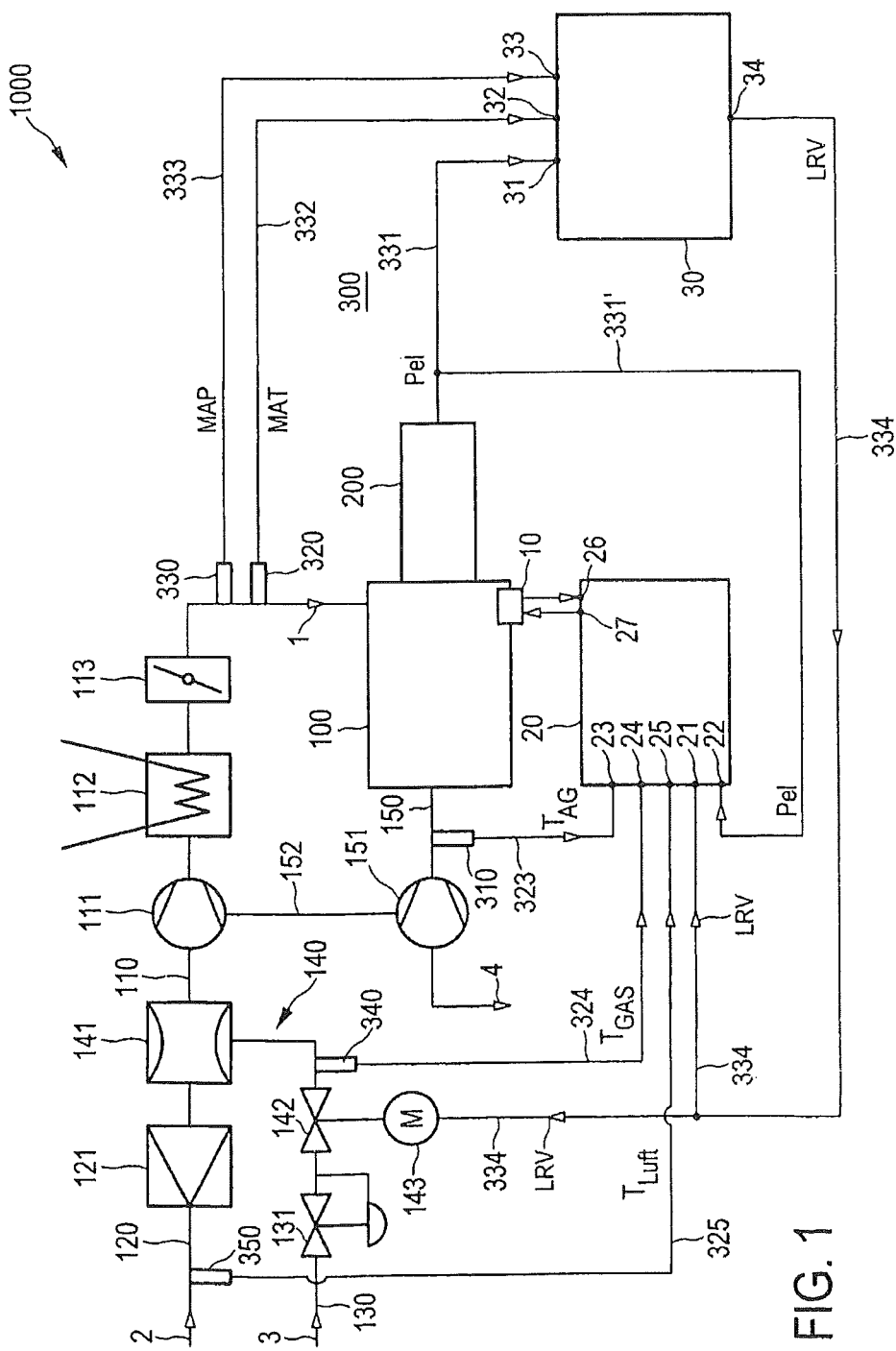
FIG. 1 a diagram of a gasoline engine with a generator to form a power aggregate according to an exemplary embodiment, in which the ignition time of the gasoline engine can be predetermined by an ignition timer in combination with a mixture control.

FIG. 1 shows a power aggregate 1000 to form a decentralized energy generation with a heat exchanger, not shown in greater detail, to implement a power-heat cogeneration. The power aggregate 1000 comprises a gasoline engine 100 and a generator 200 connected thereto to form a power aggregate 1000.

Figure 2:
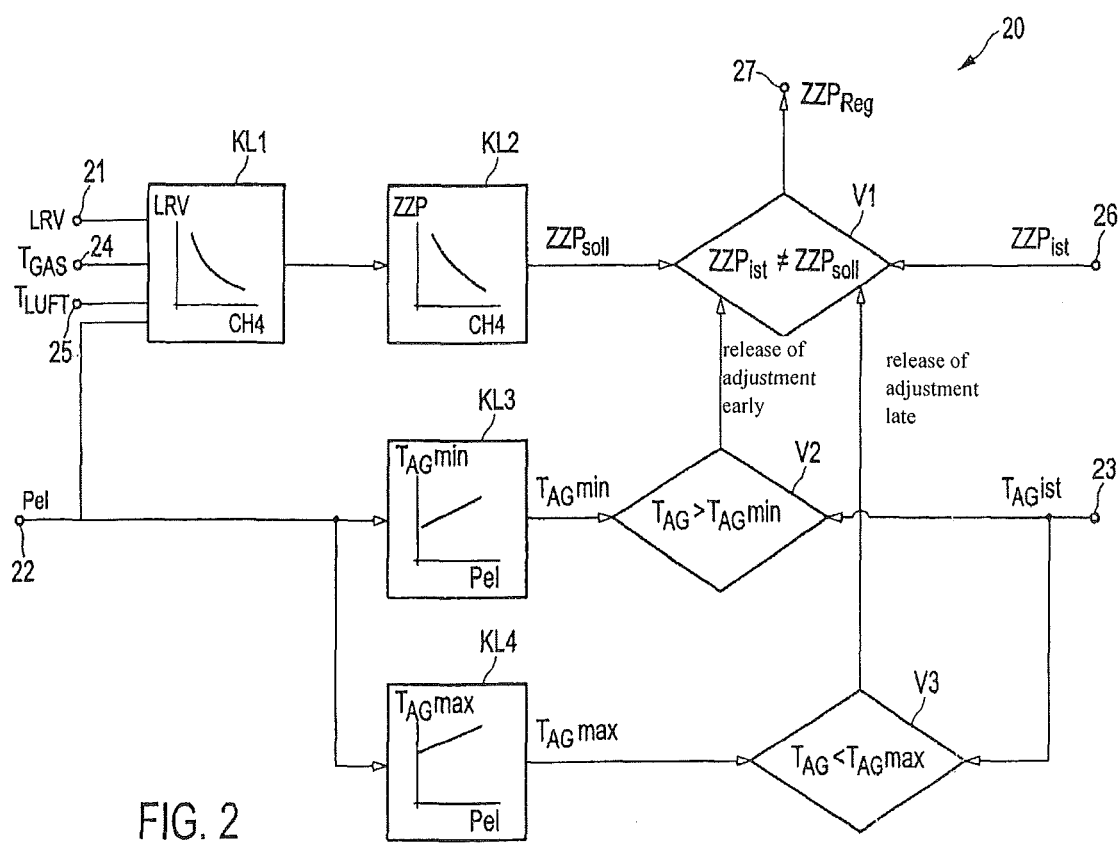
FIG. 2 a schematic illustration of an internal diagram of the ignition timer to illustrate a processing schedule to operate a gasoline engine with an adjustment of the ignition time.
Figure 3:
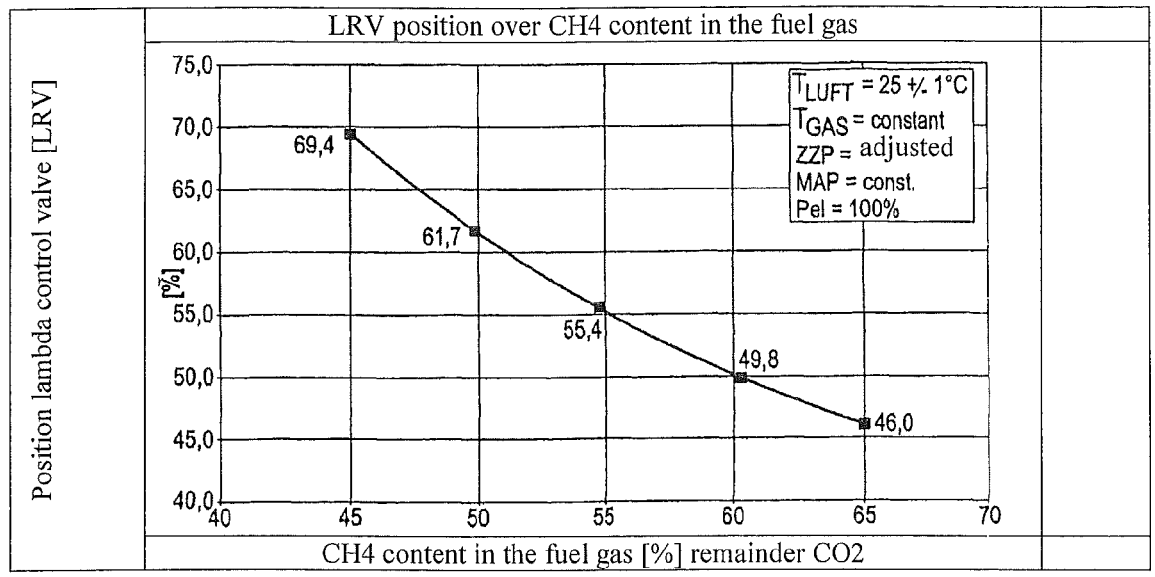
FIG. 3 an exemplary illustration of a throttle setting of a component of the mixing arrangement in the form of the position of a lambda gas control valve via the caloric value of the fuel gas in the form of the $CH_4$ content in the fuel gas, which is suitable as a largely linear connection to control the ignition time.
Figure 4:
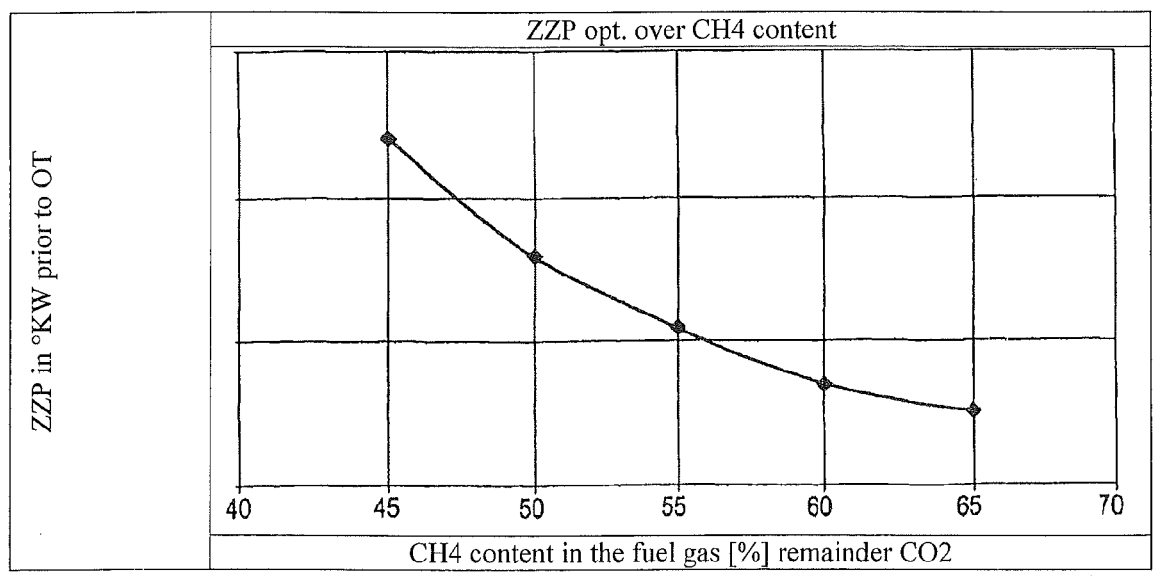
FIG. 4 an exemplary characteristic of an ignition time designed for a gasoline engine depending on a caloric value of the fuel gas in the form of an optimized ignition time via the $CH_4$ content of a fuel gas.

Within the scope of a method, explained in greater detail in FIG. 2, for operating the gasoline engine 100 using biogas, this engine can be operated with an adjustment of the ignition time in order to compensate for widely fluctuating compositions and thus caloric values of the fuel gas, e.g., in fluctuating ranges from 45% to 65% of the $CH_4$ content. The alternating $CH_4$ content is usually faced by a complementary gas content of $CO_2$ so that with an increasing $CO_2$ content the combustion speed of the gas/air mixture, i.e. the combustion gas mixture, is reduced. By adjusting the ignition time, as explained in the following, particularly a reduced combustion speed can be compensated and thus both the effectiveness as well as a $NO_x$ emission of the gasoline engine can be kept quasi constant, which is shown in the results of FIGS. 3 and 4.

The gasoline engine 100 of the exemplary embodiment shows an ignition device 10 which serves via an ignition timer 20 in combination with a mixture control 30 to predetermine a variable ignition time.

In detail, the power aggregate 1000 is designed as follows. At the input side, the gasoline engine 100 comprises a combustion gas mixture supply 110 to supply a combustion gas mixture 1 to a combustion chamber of the gasoline engine 100, not shown in greater detail. The combustion gas mixture 1 is first compressed in the combustion gas mixture supply 110 by a compressor 111 and subsequently the elevated temperature of the combustion gas mixture 1 achieved thereby is reduced in a heat exchanger 112. The combustion gas mixture 1 cooled this way is then fed via a throttle valve 113 to the combustion chamber of the gasoline engine 100 depending on the power needed. The combustion gas mixture 1 develops by mixing air 2 and gas 3. The air is suctioned in the air intake 120, filtered in a filter 121, and then fed to a mixer 141 of a mixing arrangement 140 formed as a choke. The gas 3 is obtained from a gas reservoir, not shown in greater detail, and is available in a gas supply 130 at a shut-off valve 131. When opening the shut-off valve 131 the gas is fed via a controllable lambda control valve 142 as a part of the mixing arrangement 140 to the mixer 141 as needed. In the present case the choke is combined with a zero-pressure control. The component of the mixing arrangement 140 that can be controlled as a lambda control valve 142 can be adjusted in the present case via an actuator 143 in the form of a motor with a predetermined opening angle. This way, different quantities of gas 3 can be supplied to the mixer 141 of the mixing arrangement 140, depending on the throttle setting of the lambda control valve 142. In other words, in the mixer 141, depending on the selection of a setting of the lambda control valve 142, different compositions of air 2 and gas 3 can be provided.

The composition of the combustion gas mixture 1, variably adjustable in this way, is supplied in the above-explained fashion via the combustion gas mixture 110 to a combustion chamber of the gasoline engine 100. Via the ignition device 10, the combustion gas mixture 1 is ignited in the combustion chamber, burned, and supplied as exhaust 4 via the exhaust of the combustion chamber to an exhaust pipe 150. In the exhaust pipe, the exhaust 4 is guided via a turbine 151. The turbine 151 drives via a shaft 152 the above-explained compactor 111 in the combustion gas mixture drive 110.

The further illustration of the power aggregate 1000 in FIG. 1 comprises the control device 300 of the power aggregate. The aggregate comprises the above-mentioned ignition device 10, the ignition timer 20, and the mixture control 30, as well as the sensors and the measuring and control lines explained in the following.

The mixture control 30 comprises inputs 31, 32, 33, each respectively serving to supply sensor signals for an electric power $P_{el}$ of the generator, a temperature MAT, as well as a pressure MAP of the combustion gas mixture 1 upstream in reference to a combustion gas manifold of the gasoline engine 100. The temperature MAT, as well as the pressure MAP, are therefore measured downstream in reference to the heat exchanger 112, behind a throttle valve 113, and upstream in reference to a combustion chamber of the gasoline engine. The electric power $P_{el}$ of the generator 200 is determined thereat and fed via a measuring line 331 to the input 31. The temperature MAT of the combustion gas mixture upstream in reference to the inlet manifold of the gasoline engine 100 is determined via a temperature sensor 320 and fed in a measuring line 332 to the input 32 of the mixing control 30. The pressure MAP of the combustion gas mixture 1 upstream in reference to the inlet manifold of the gasoline engine 100 is determined via a sensor 330 and fed via a measuring line 333 to the input 33 of the mixture control 30. The sensors 320, 330 are accordingly positioned in close proximity of the combustion gas mixture supply 110 between the throttle valve 113 and the inlet manifold of the gasoline engine 100.

The mixture control 30 additionally comprises an outlet 34, which is connected via a control line 334 both to the ignition timer 20 as well as to the actuator 143 in the form of a motor for the lambda control valve 142. The control line 334 serves to transmit a target value for the throttle position LRV of the actuator 143 of the lambda control valve 142. In the present case the throttle setting LRV is formed as a target value of a control variable for the lambda control valve 142. The signal for the target value of the throttle setting LRV is forwarded by the control line 334 to an input of the actuator 143 as well as simultaneously to the input 21 of the ignition timer 20. The ignition timer further comprises an inlet 22, which is connected to a fork of the measuring line 331, namely another measuring line 331' to transmit the electric power $P_{el}$ of the generator 200 to the ignition timer 20. Thus the ignition timer 20 is provided with the throttle setting LRV as a target value at the input 21 and the electric power $P_{el}$ of the generator 200 at the input 22. Furthermore, the ignition timer 20 comprises three additional inputs 23, 24, 25, which serve to receive temperature values. At the input 23 of the ignition timer 20 a sensor line 323 is connected to guide an exhaust temperature T_AG from an exhaust temperature sensor 310. The exhaust temperature sensor 310 is connected to an exhaust pipe 150 between the outlet manifold of the gasoline engine 100 and the turbine 151. At the input 24 of the ignition timer 20 a sensor line 324 from a gas temperature sensor 340 is connected to transmit a gas temperature $T_{gas}$. The gas temperature sensor 340 is connected to a gas guidance 130 for the fuel gas 3 between the lambda control valve 142 and the mixer 141. A sensor line 325 from a temperature sensor 350 is connected at the input 25 to transmit an air temperature $T_{luft}$. The air temperature sensor 350 is connected to an air guidance 120 upstream in reference to a filter 121.

This way, at the inputs 21, 22 the throttle setting LRV of the lambda control valve 142 and the electric power $P_{el}$ of the generator 200 are connected. Connected to the inputs 23, 24, 25 are the temperatures T_AG, $T_{gas}$, and $T_{luft}$ of the exhaust 4, the fuel gas 3, and the air 2. The ignition timer 20 determines an ignition time. As shown in FIG. 2, this is provided depending on the exhaust temperature T_AG and the throttle setting LRV, with the throttle setting LRV being present as a target value of the control variable for the actuator 143 of the lambda control valve 142 of the mixture control 30. Following the concept of the disclosure, the predetermination of the throttle setting LRV largely serves to adjust the ignition time of the gasoline engine 100 via the ignition device 10 thereof depending on the exhaust temperature T_AG and the throttle setting LRV. The throttle setting LRV is predetermined as a target value by the mixture control 30 also to the actuator 143 of the lambda control valve 142. Thus, an adjustment of the ignition time occurs as a function of the throttle setting LRV and the exhaust temperature T_AG.

In a modified embodiment, not shown here, the throttle setting LRV can also be provided to the ignition timer 20 in a different form than the target value of the throttle setting LRV presented here. In this modification for example the target value of the throttle setting LRV can only be provided to the actuator 143. Subsequently an actual value of the throttle setting LRV can be transmitted to the input 21 of the ignition timer 20.

Both modifications use the correlation between the throttle setting LRV of one component of the mixing arrangement 140, namely in the present case the actuator 143 for the lambda control valve 142, and the ignition time ZZP, which the invention has recognized as being reliable.

It has been shown that the reliable correlation recognized by the disclosure is dependent only to a relatively minor extent on the temperatures of the air, the fuel gas, and the operating power T_LUFT, T_GAS, $P_{el}$, which are also connected to the inputs 22, 24, 25 at the ignition timer 20. Such imprecisions caused by the air temperature T_LUFT, the gas temperature T_GAS, and the electric operating power $P_{el}$ can be corrected by a linear processing of respective sensor signals in the sensor lines 324, 325, and 331, 331'.

FIG. 2 generally explains the method to adjust the ignition time ZZP of the gasoline engine 100 based on an internal circuit diagram of the ignition timer 20. For the further illustration of the ignition timer 20 in FIG. 2 this is shown with the input 21 shown in FIG. 1 for the mixing setting LRV of the lambda control valve 142, the input 22 for the electric operating power $P_{el}$ of the generator 200, the input 24 for the temperature T_GAS of the fuel gas, and the input 25 for the temperature T_LUFT of the air. Additionally the ignition timer 20 comprises an input 23 for the exhaust temperature T_AG and an input for the actual value $ZZP_{ist}$ of an ignition time 26, not shown in FIG. 1. Furthermore, the output 27 is shown for a control value of the ignition time $ZZP_{reg}$.

In a computing unit of the ignition timer 20, not shown in greater detail, a first characteristic KL1 is saved, which indicates the throttle setting LRV of the actuator 143 for the lambda control valve 142 depending on a caloric value of the fuel gas, in the present case the $CH_4$ content in the fuel gas. The characteristic KL1 is adjusted to the gasoline engine 100 and can be determined, for example, by an appropriate test measurement or a simple initialization or a similarly standardized calibration for a gasoline engine of a certain type. In a similar process a second characteristic KL2 is saved in the computing unit of the ignition timer 20, which indicates the ignition time ZZP depending on a caloric value of the fuel gas, in the present case the $CH_4$ content in the fuel gas. By correlating the characteristics KL1 and KL2 therefore via the throttle setting LRV applied to the input 21 conclusions can be drawn for the caloric value of the fuel gas, and subsequently a target value, be determined for the ignition time $ZZP_{soll}$. The target value of the ignition time $ZZP_{soll}$ is then provided to a reference member V1 of the ignition timer 20. In the reference member V1 it is compared whether the target value of the ignition time $ZZP_{soll}$ is equivalent to the actual value of the ignition time $ZZP_{ist}$. In the event of a deviation the control value of the ignition time $ZZP_{reg}$, determined from the target value and the actual value of the ignition time, is applied as a control value at the output 27 of the ignition timer 20. In the simplest case given the target value $ZZP_{soll}$ shows the control value of the control value $ZZP_{reg}$. Furthermore, the target value $ZZP_{soll}$ serves initially to illustrate a preliminary ignition time, which is explained in the following.

The above-explained simple, linear, optionally available corrections are considered in the characteristic KL1 via the fuel gas temperature T_GAS at the input 24 and the air temperature T_LUFT at the input 25, as well as the operating power $P_{el}$ at the input 22. The above-explained generally reliable correlation between the throttle setting LRV and the ignition time ZZP remains unaffected thereby.

In the exemplary embodiment of FIG. 2, within the scope of a particularly exemplary further development, a control of the preliminary ignition time $ZZP_{soll}$ occurs via the reference member V2 and V3. The control occurs by utilizing the operating power $P_{el}$ of the generator 200 at the input 22 and the actual exhaust temperature T_AG at the input 23 as the actual value of the ignition timer 20. Larger air contents may lead in practice to disturbing influences in the timer setting. Accordingly the determined target value of the ignition time $ZZP_{soll}$, also called the preliminary target time, is issued in the present case via the outlet 27 not without [first] being checked. Initially this is to be released via the control condition provided by the reference members V2 and V3. For this purpose, depending on the present engine power $P_{el}$ the lower and upper limit $T\_AG_{min}$ and/or $T\_AG_{max}$ are determined for the exhaust temperature T_AG via the additional characteristics KL3 and/or KL4. They are compared in the reference members V2, V3 with the present exhaust temperature T_AG as the actual value. If this actual value ranges between the limits $T\_AG_{min}$ and $T\_AG_{max}$, a positive release is provided to the reference member V1 by the reference members V2, V3. Only if there is release is the preliminary ignition time $ZZP_{soll}$ provided as the actual control value for the ignition time $ZZP_{reg}$ from the ignition timer 20 via the output 27 to the ignition device of the gasoline engine 100. The characteristics KL3, KL4 to illustrate a lower and upper limit $T\_AG_{min}$ and/or $T\_AG_{max}$ essentially follow a linear relationship in reference to the electric operating power $P_{el}$. Thus, when the exhaust temperature T_AG is between these limits at a certain given power $P_{el}$ the above-mentioned preliminary setting for the ignition time $ZZP_{soll}$ is released as the control value $ZZP_{reg}$.

If this does not occur, the presently given exhaust temperature T_AG exceeds the upper limit $T\_AG_{max}$ or falls short of the presently given exhaust temperature $T\_AG_{min}$. The lower limit $T\_AG_{min}$ prevents for the ignition time being set too early due to high air or nitrogen contents in the fuel gas. Although they lower the caloric value of the fuel gas, similar to $CO_2$, they have no or only irrelevant influence upon the combustion speed in the cylinder of the gasoline engine 100. If ignition were allowed to be set too early due to high air contents this would result in the NOx emission limits being exceeded and potentially lead to knocking combustion. In this case the reference member V2 therefore detects the minimal exhaust temperature $T\_AG_{min}$ being too low and prevents the release of the preliminary timer setting. In the other case the limit $T\_AG_{max}$ prevents older engines with an elevated exhaust temperature due to wear and tear from being operated at even higher temperatures by the ignition time being adjusted even later and thus running the risk of being shut off for malfunction. In this case the reference member V3 prevents any release of the preliminary ignition setting because it is determined that the presently given actual value T_AG already exceeds the maximum T_AG$_{max}$ for the exhaust temperature of turbochargers. By the reference members V2, V3 particularly a disadvantageous adjustment of the ignition time for a point too early is prevented due to the setting of the ignition time of the gasoline engine 100 being dependent on the exhaust temperature.

Overall, in the following exemplary embodiment the adjustment of the ignition time ZZP of the gasoline engine 100 is established via the adjustment of the ignition time by the control system of the ignition time ZZP$_{reg}$ depending on the exhaust temperature such that the exhaust temperature is considered in the established control by the reference members V2 and V3. Independent therefrom however initially a preliminary target value of the ignition time ZZP$_{soll}$ is exclusively determined from the mixing setting LRV.

FIG. 3 shows an exemplary characteristic KL1, as it can be used in the ignition timer 20 of FIG. 2. In the present case the reproducible connection between the throttle setting LRV and the caloric value of the combustion gas, here the $CH_4$ content in the fuel gas, results, with a choke and a zero-pressure control for the formation of a mixture of the combustion gas mixture in the mixing arrangement 140 of FIG. 1. As already explained, the influences of the engine power P$_{el}$, air and gas temperature T$_{luft}$, T$_{gas}$ are only minor and can be neglected and/or compensated with linear corrections.

Using the information gathered with the help of the characteristic KL1 of FIG. 3, for example, regarding the composition of the fuel gas and/or the caloric value of the fuel gas now the optimal ignition time can be adjusted with sufficient ability of achieving leaner mixtures according to the characteristic KL2. This is a respective engine-specific characteristic KL2, as it can be adjusted e.g., according to FIG. 4, optimally for effectiveness and emissions for the gasoline engine 100. For this purpose FIG. 4 shows the crankshaft angle in front of the upper dead point as the optimal ignition time according to the characteristic KL2 in FIG. 2 to yield a target value of an ignition time ZZP$_{soll}$ from the composition of the fuel gas.

Figure 5:
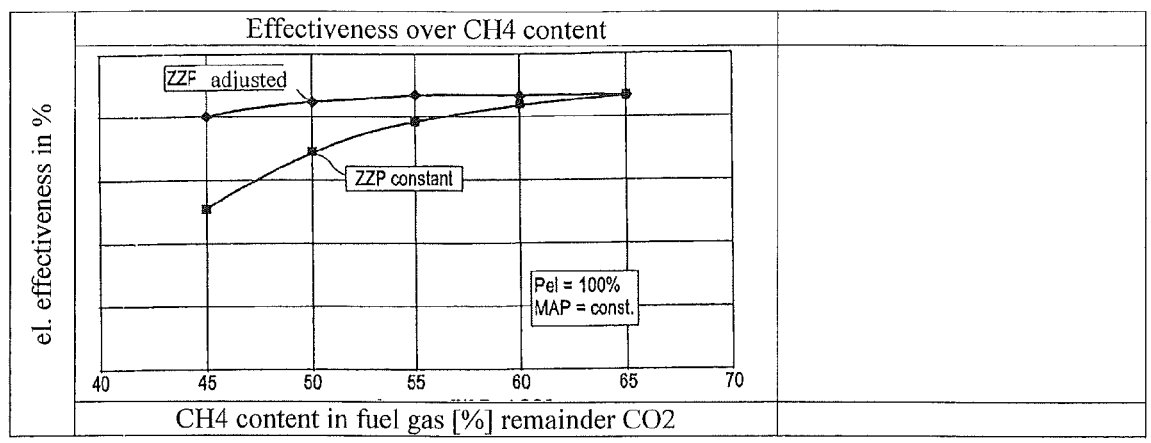
FIG. 5 a largely constant electric effectiveness with an adjustment of the ignition time according to the above-described embodiments, contrary to a development thereof with a constant ignition time.
Figure 6:
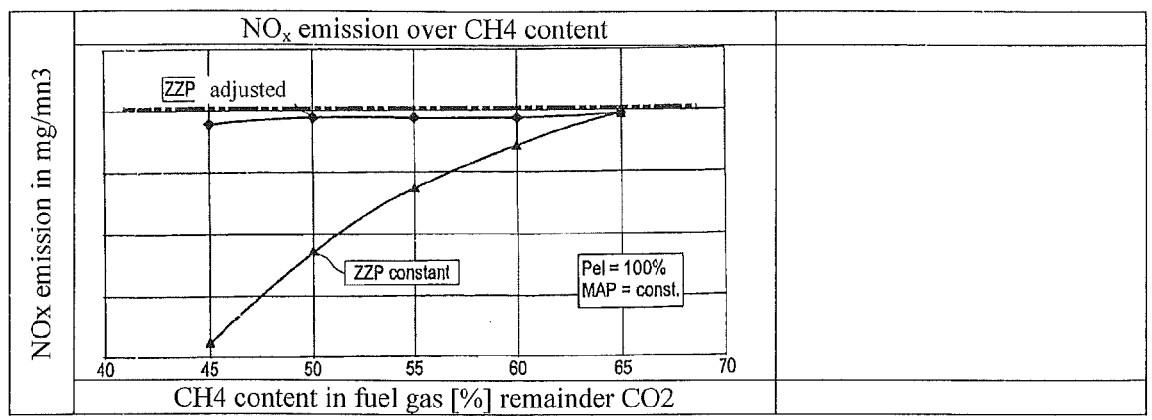
FIG. 6 a largely constant NO emission with an adjustment of the ignition time according to the above-described embodiments contrary to a development with a constant ignition time.

FIG. 5 shows that by an adjustment of the ignition time ZZP according to the present exemplary embodiment an electric effectiveness can be kept almost constant over a wide range of compositions of the fuel gas. Additionally FIG. 6 shows that a NO$_x$ emission can be kept constant over a wide range of a $CH_4$ content of the fuel gas. In both cases the above curves apply, provided with rhombs. As a reference example the considerably falling effectiveness and/or the considerable increasing NOx emission are discernible when the composition of the fuel gas changes as discernible in the bottom curve when the ignition time is kept constant.

Achieving a largely constant electric effectiveness and/or a largely constant NO$_x$ emission is important in order to allow the operating of a power aggregate and/or a catalytic converter connected to the power aggregate effectively and in compliance with emissions statutes.

Summarizing, the disclosure relates to a method for operating a gasoline engine 100, preferably for the operation with fuel gas in the form of biogas, while adjusting the ignition time ZZP of the gasoline engine 100 comprising the steps: mixing air 2 and fuel gas 3 to form a combustion gas mixture 1 in a mixing arrangement 140; feeding and igniting the combustion gas mixture 1 in the combustion chamber under the adjustment of the ignition time ZZP, as well as burning the combustion gas mixture 1 with the discharge of exhaust 4 from the combustion chamber. According to the concept of the disclosure, additional steps are provided: Detecting the exhaust temperature T_AG of the exhaust 4; predetermining at least one throttle setting LRV of a component of the mixing arrangement 140; adjusting the ignition time ZZP of the gasoline engine 100 depending on the exhaust temperature T_AG and the throttle setting LRV. In particular the throttle setting LRV is predetermined by a mixture control 30 as a control variable.

The invention claimed is:

1. A method for operating a gasoline engine with fuel gas in the form of biogas, with an ignition time being adjusted, comprising:
   mixing air and fuel gas to form a combustion gas mixture in a mixing arrangement;
   supplying and igniting the combustion gas mixture in a combustion chamber with an adjustment of the ignition time as well as burning the combustion gas mixture and discharging exhaust from the combustion chamber;
   detecting an exhaust temperature of the exhaust;
   predetermining at least one throttle setting of a component of the mixing arrangement;
   adjusting the ignition time of the gasoline engine depending on the exhaust temperature and the throttle setting, with the throttle setting being predetermined by a mixture control as a control variable; wherein the ignition time is adjusted based at least upon:
      a caloric value of the fuel gas stated depending on the throttle setting; and
      a target value of the ignition time stated depending on the caloric value of the fuel gas;
      wherein the statements are corrected in order to provide the target value of the ignition time of the gasoline engine depending on the throttle setting.

2. A method according to claim 1, wherein the throttle setting is predetermined by the mixture control as the control variable with a target value to the component of the mixing arrangement and an ignition timer, to adjust the ignition time via an ignition device of a gasoline engine depending on the exhaust temperature and the throttle setting.

3. A method according to claim 1, wherein:
   the throttle setting is predetermined by the mixture control as the control variable with a target value to the component of the mixing arrangement and the throttle setting by the component as the actual value to an ignition timer, to adjust the ignition time via an ignition device of a gasoline engine depending on the exhaust temperature and the throttle setting.

4. A method according to claim 1, wherein:
   the ignition time is adjusted depending on an actual value of the exhaust temperature.

5. A method according to claim 1, wherein:
   the ignition time is adjusted depending on the throttle setting such that first a preliminary ignition time is determined exclusively based on the throttle setting.

6. A method according to claim 1, wherein the caloric value of the fuel gas is stated based on a composition of the fuel gas or a composition of the fuel gas is stated directly depending on the throttle setting.

7. A method according to claim 1, wherein the ignition time is adjusted via a control value of the ignition time depending on a target value of the ignition time and an actual value of the ignition time as well as an exhaust temperature such that an actual value of an exhaust temperature is or remains within a predetermined exhaust temperature range.

8. A method according to claim 7, wherein:
   the control value of the ignition time of an ignition device of the gasoline engine is transmitted as a guideline only when the actual value of the exhaust temperature is within a predetermined exhaust temperature range.

9. A method according to claim 7, wherein:
the exhaust temperature range is determined via a maximum exhaust temperature and a minimum exhaust temperature dependent on an output power of the gasoline engine, particularly an output power of a generator connected to the gasoline engine.

10. A control device for operating a gasoline engine, operated with a fuel gas in the form of biogas, with an ignition time of the gasoline engine being adjusted, comprising:
a mixing control with an output for a control variable to predetermine a throttle setting of a component of a mixing device for air and fuel gas to form a combustion gas mixture,
an ignition timer, including:
an input for an exhaust temperature of an exhaust from the combustion chamber of the gasoline engine and
an input for a throttle setting of the component of the mixing arrangement,
a processor configured to predetermine an ignition time for an ignition device of the gasoline engine depending on the exhaust temperature and the throttle setting,
an output for the ignition time to the ignition device of the gasoline engine,
a control line to guide a value for the throttle setting from the mixture control to the ignition timer and the component of the mixing arrangement;
wherein control line is configured to adjust the ignition time based at least upon:
a caloric value of the fuel gas stated depending on the throttle setting; and
a target value of the ignition time stated depending on the caloric value of the fuel gas;
wherein the statements are corrected in order to provide the target value of the ignition time of the gasoline engine depending on the throttle setting.

11. A control device according to claim 10, wherein:
the mixing control and the ignition timer are connected via the control line to guide a target value for the throttle setting.

12. A control device according to claim 11, wherein:
the ignition timer and the component of the mixing arrangement are connected via the control line to guide an actual value for the throttle setting.

13. A control device according to claim 10, wherein:
the processor of the ignition timer shows a characteristic for a throttle setting of a component of the mixing arrangement of the gasoline engine designed for a gasoline engine with the characteristic stating the throttle setting depending on a composition of the fuel gas.

14. A control device according to claim 10, wherein:
the processor of the ignition timer comprises characteristic for an ignition time-designed for the gasoline engine for an ignition device of the gasoline engine, with the characteristic stating the ignition time depending on a composition of the fuel gas.

15. A control device according to claim 10, wherein:
the ignition timer comprises a control unit, by which an ignition time can be released in case an actual value of an exhaust temperature is in a range of the exhaust temperature depending on an output power of the gasoline engine.

* * * * *